US011528225B2

United States Patent
Zhou et al.

(10) Patent No.: US 11,528,225 B2
(45) Date of Patent: Dec. 13, 2022

(54) COMMUNICATION METHOD, SESSION MANAGEMENT DEVICE, AND SYSTEM FOR PACKET ROUTING BY ACCESS NETWORK DEVICES BELONGING TO A SAME NETWORK INSTANCE HAVING DIFFERENT NETWORK ADDRESSES

(71) Applicant: Huawei Technologies Co., Ltd., Shenzhen (CN)

(72) Inventors: Runze Zhou, Shanghai (CN); Shengxian Nie, Shanghai (CN); Zhongping Chen, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/036,909

(22) Filed: Sep. 29, 2020

(65) Prior Publication Data

US 2021/0014164 A1   Jan. 14, 2021

Related U.S. Application Data

(63) Continuation of application No. PCT/CN2019/080637, filed on Mar. 29, 2019.

(30) Foreign Application Priority Data

Mar. 31, 2018   (CN) ......................... 201810278762.6

(51) Int. Cl.
*H04L 12/28* (2006.01)
*H04L 45/74* (2022.01)
*H04L 67/141* (2022.01)

(52) U.S. Cl.
CPC ............ *H04L 45/74* (2013.01); *H04L 67/141* (2013.01)

(58) Field of Classification Search
CPC .............................. H04L 45/74; H04L 67/141
USPC .......................................................... 370/392
See application file for complete search history.

(56) References Cited

U.S. PATENT DOCUMENTS

| 2018/0227229 A1* | 8/2018 | Lopez ..................... H04L 69/22 |
| 2019/0158360 A1* | 5/2019 | Xu ......................... H04W 24/10 |
| 2019/0208572 A1 | 7/2019 | Wang et al. |
| 2019/0387393 A1 | 12/2019 | Xu et al. |

(Continued)

FOREIGN PATENT DOCUMENTS

| CN | 103096394 A | 5/2013 |
| CN | 104301141 A | 1/2015 |

(Continued)

OTHER PUBLICATIONS

3GPP TS 23.501 V15.1.0, Mar. 2018, pp. 1-201, XP051450586 (Year: 2018).*

(Continued)

*Primary Examiner* — Hee Soo Kim
(74) *Attorney, Agent, or Firm* — Conley Rose, P.C.

(57) ABSTRACT

A communication method in which access network devices belonging to a same network instance have different network addresses, where the method includes uniquely identifying an access network device based on a network address of the access network device and a first network instance identifier to which the access network device belongs, and determining a packet forwarding rule for sending a packet to the access network device. In this way, the packet can be accurately routed.

19 Claims, 4 Drawing Sheets

(56) References Cited

U.S. PATENT DOCUMENTS

| | | | | |
|---|---|---|---|---|
| 2020/0344204 A1* | 10/2020 | Nie | ...................... | H04L 61/2007 |
| 2021/0315027 A1* | 10/2021 | Godin | ................... | H04W 76/10 |
| 2022/0060416 A1* | 2/2022 | Zhu | ...................... | H04L 61/2069 |

FOREIGN PATENT DOCUMENTS

| | | | |
|---|---|---|---|
| CN | 104301221 | A | 1/2015 |
| CN | 107318158 | A | 11/2017 |
| CN | 107690161 | A | 2/2018 |
| WO | 2018021861 | A1 | 2/2018 |
| WO | 2018021873 | A1 | 2/2018 |
| WO | 2018045501 | A1 | 3/2018 |

OTHER PUBLICATIONS

3GPP TS 23.501 V1.4.0, "3rd Generation Partnership Project; Technical Specification Group Services and System Aspects; System Architecture for the 5G System; Stage (Release 15)," Sep. 2017, 151 pages.

3GPP TS 38.413 V0.7.0, "3rd Generation Partnership Project; Technical Specification Group Radio Access Network NG-RAN; NG Application Protocol (NGAP) (Release 15)," Mar. 2018, 121 pages.

3GPP TS 23.501 V15.1 0, "3rd Generation Partnership Project;Technical Specification Group Services and System Aspects;System Architecture for the 5G System;Stage 2 (Release 15)," Mar. 2018, 201 pages.

3GPP TS 23.502 V15.1 0 "3rd Generation Partnership Project; Technical Specification Group Services and System Aspects; Procedures for the 5G System; Stage 2 (Release 15)," Mar. 2018, 285 pages.

"3rd Generation Partnership Project; Technical Specification Group Core Network and Terminals; Interface between the Control Plane and the User Plane Nodes; Stage 3 (Release 15)," 3GPP TS 29.244 V15.1.0, Technical Specification, Mar. 2018, 170 pages.

* cited by examiner

COMMUNICATION METHOD, SESSION MANAGEMENT DEVICE, AND SYSTEM FOR PACKET ROUTING BY ACCESS NETWORK DEVICES BELONGING TO A SAME NETWORK INSTANCE HAVING DIFFERENT NETWORK ADDRESSES

CROSS-REFERENCE TO RELATED APPLICATIONS

This application is a continuation of International Patent Application No. PCT/CN2019/080637, filed on Mar. 29, 2019, which claims priority to Chinese Patent Application No. 201810278762.6, filed on Mar. 31, 2018, both of which are hereby incorporated by reference in their entireties.

TECHNICAL FIELD

This application relates to the field of communications technologies, and in particular, to a communication method and a communications apparatus.

BACKGROUND

A protocol data unit (PDU) session is a session between a terminal (for example, user equipment (UE)) and a data network (DN), and is used to provide a PDU connection service. In a process of establishing the PDU session, a session management device (for example, a session management function (SMF) network element) needs to select a user plane function (UPF) network element on a core network side for the PDU session. The UPF and an access network (for example, a radio access network (RAN)) serving the UE jointly form a data channel for processing a packet in the PDU session. Because a non-access stratum (NAS) layer protocol is used in the process of establishing the PDU session, the PDU session may also be referred to as a NAS session.

Usually, a network device has a network protocol (for example, an Internet Protocol (IP)) address, which is different from an IP address of another device. However, in a future communications system, as a quantity of devices increases, it may not be ensured that each device has a unique IP address different from that of another device. In this way, a solution used to resolve the foregoing problem is to classify devices into a specific network instance (NI). Devices in a network instance need to have different IP addresses, but devices in different network instances may have same IP addresses. Therefore, a same IP address can be reused by a plurality of devices. One PDU session may be associated with one network instance. For example, an access network device used to form a data channel for the PDU session belongs to the network instance.

Currently, in a fifth generation (5G) communications system, a user plane device receives packets from a plurality of access network devices. When the access network devices have same IP addresses, there is no specific solution that can be used for the user plane device to accurately forward a packet.

SUMMARY

Embodiments of this application provide a communication method and a communications apparatus, to resolve a problem of how a user plane device forwards a packet.

According to a first aspect, an embodiment of this application provides a communication method, including receiving, by a user plane device, a first message from a session management device, where the first message is used to request establishing or updating a first session, the first message includes a first network instance identifier of a network instance to which an access network device serving a terminal belongs and a network address of the access network device, and the network address is located in a packet forwarding rule in the first message, determining, by the user plane device, a packet forwarding address based on the first network instance identifier and the network address, and receiving, by the user plane device, a packet, determining that the packet forwarding rule in the first message is applicable to the received packet, and sending the packet using the packet forwarding address.

According to the method provided in this embodiment of this application, because access network devices belonging to a same network instance have different network addresses, the access network device may be uniquely identified based on the network address of the access network device and the first network instance identifier of the network instance to which the access network device belongs, to determine the packet forwarding address used to send the packet to the access network device. In this way, a receiver that receives the packet can be uniquely determined, thereby avoiding a problem that the receiver cannot be determined when the packet is routed only based on the network address.

In a possible design, the first network instance identifier is located in the packet forwarding rule, or the first network instance identifier is located in the first message but outside the packet forwarding rule.

In a possible design, the first message further includes at least one packet detection rule associated with the packet forwarding rule, and the determining, by the user plane device, that the packet forwarding rule in the first message is applicable to the received packet includes matching, by the user plane device, header information of the received packet with the at least one packet detection rule, and determining, if the matching succeeds, that the packet forwarding rule is applicable to the packet.

In a possible design, the packet forwarding address is any one of or a combination of a plurality of the following a media access control (MAC) address, a tunnel endpoint identifier (TEID), a data link layer address, and a virtual local area network identifier (VLAN ID).

This embodiment of this application provides a communications apparatus, and the communications apparatus may perform any one of the foregoing methods.

In a possible design, the apparatus includes one or more processing units and a communications unit. The one or more processing units are configured to support the apparatus in performing a corresponding function of the session management device in the foregoing methods. The communications unit is configured to support the apparatus in communicating with another device, to implement a receiving function and/or a sending function. For example, the communications unit is configured to implement a function of sending the first message.

The apparatus may be a UPF or the like, and the communications unit may be a communications interface. Optionally, the communications interface may alternatively be an input/output circuit or interface.

The apparatus may alternatively be a communications chip. The communications unit may be an input/output circuit or interface of the communications chip.

In another possible design, the apparatus includes a communications interface and a processor. The processor is configured to control the communications interface to receive and send a signal, and the processor is configured to perform the method completed by the user plane device in the first aspect or any one of the possible implementations of the first aspect.

Optionally, the apparatus includes a memory. The memory is configured to store a computer program that can implement the first aspect or any one of the possible implementations of the first aspect.

According to a second aspect, an embodiment of this application provides a communication method, including receiving, by a session management device, a request for establishing or updating a second session for a terminal, obtaining, by the session management device, a first network instance identifier of a network instance to which an access network device serving the terminal belongs, and sending, by the session management device, a first message to a user plane device, where the first message is used to request establishing or updating a first session, the first session is associated with the second session, the first message includes the first network instance identifier and a network address, and the network address is located in a packet forwarding rule in the first message.

In a possible design, the obtaining, by the session management device, a first network instance identifier of a network instance to which an access network device serving the terminal belongs includes receiving, by the session management device, the first network instance identifier from an access and mobility management device, receiving, by the session management device, the first network instance identifier from the access network device, or determining, by the session management device, the first network instance identifier based on a first parameter that is from the terminal or the access network device and a second parameter stored in the session management device, where the first parameter is one of or a combination of an identifier of the access network device and the network address of the access network device, and the second parameter is a correspondence between one or more parts of the first parameter and a network instance identifier.

In a possible design, the method further includes obtaining, by the session management device, a second network instance identifier of a network instance to which the user plane device belongs, and sending, by the session management device, the second network instance identifier to the access network device.

This embodiment of this application provides a communications apparatus, and the communications apparatus may perform any one of the foregoing methods.

In a possible design, the apparatus includes one or more processing units and a communications unit. The one or more processing units are configured to support the apparatus in performing a corresponding function of the user plane device in the foregoing methods. The communications unit is configured to support the apparatus in communicating with another device, to implement a receiving function and/or a sending function. For example, the communications unit is configured to implement a function of receiving the first message.

The apparatus may be an SMF or the like, and the communications unit may be a communications interface. Optionally, the communications interface may alternatively be an input/output circuit or interface.

The apparatus may alternatively be a communications chip. The communications unit may be an input/output circuit or interface of the communications chip.

In another possible design, the apparatus includes a communications interface and a processor. The processor is configured to control the communications interface to receive and send a signal, and the processor is configured to perform the method completed by the session management device in the second aspect or any one of the possible implementations of the second aspect.

Optionally, the apparatus includes a memory. The memory is configured to store a computer program that can implement the second aspect or any one of the possible implementations of the second aspect.

According to a third aspect, an embodiment of this application provides a communication method, including receiving, by a user plane device, a first message from a session management device, where the first message is used to request establishing or updating a first session, and the first message includes a packet forwarding rule and a packet forwarding address corresponding to an access network device serving a terminal, and receiving, by the user plane device, a packet, determining that the packet forwarding rule in the first message is applicable to the received packet, and sending the packet using the packet forwarding address.

According to the method provided in this embodiment of this application, the packet forwarding address that corresponds to the access network device is in a correspondence with a network address of the access network device and a first network instance identifier of a network instance to which the access network device belongs. The access network device may be uniquely identified based on the network address of the access network device and the first network instance identifier of the network instance to which the access network device belongs. Therefore, the packet forwarding address that corresponds to the access network device is used to avoid a problem that a receiver cannot be determined when the packet is routed only based on the network address.

This embodiment of this application provides a communications apparatus, and the communications apparatus may perform any one of the foregoing methods.

In a possible design, the apparatus includes one or more processing units and a communications unit. The one or more processing units are configured to support the apparatus in performing a corresponding function of the terminal in the foregoing methods. The communications unit is configured to support the apparatus in communicating with another device, to implement a receiving function and/or a sending function. For example, the communications unit is configured to implement a function of sending a NAS session request message.

The apparatus may be a UPF or the like, and the communications unit may be a communications interface or a transceiver circuit. Optionally, the communications interface may alternatively be an input/output circuit or interface.

The apparatus may alternatively be a communications chip. The communications unit may be an input/output circuit or interface of the communications chip.

In another possible design, the apparatus includes a communications interface and a processor. The processor is configured to control the communications interface to receive and send a signal, and the processor is configured to perform the method completed by the user plane device in the third aspect or any one of the possible implementations of the third aspect.

Optionally, the apparatus includes a memory. The memory is configured to store a computer program that can implement the third aspect or any one of the possible implementations of the third aspect.

According to a fourth aspect, an embodiment of this application provides a system. The system includes one or more of the session management device and the user plane device described above. The session management device may be further configured to perform the steps performed by the session management device in the solutions provided in the embodiments of this application. The user plane device may be further configured to perform the steps performed by the user plane device in the solutions provided in the embodiments of this application.

In a possible design, the system may further include another device that interacts with the session management device and/or the user plane device in the solutions provided in the embodiments of this application, for example, an access and mobility management device, an access network device, or a terminal device.

According to a fifth aspect, an embodiment of this application provides a computer-readable storage medium configured to store a computer program. The computer program includes an instruction for performing the method according to any aspect or any one of the possible implementations of the aspect.

According to a sixth aspect, an embodiment of this application provides a computer program product. The computer program product includes computer program code. When the computer program code is run on a computer, the computer is enabled to perform the method according to any aspect or any one of the possible implementations of the aspect.

DESCRIPTION OF EMBODIMENTS

The following describes embodiments of this application in detail with reference to the accompanying drawings in this specification.

The embodiments of this application may be applied to various mobile communications systems, for example, a new radio (NR) system, a Global System for Mobile Communications (GSM), a code-division multiple access (CDMA) system, a wideband CDMA (WCDMA) system, a General Packet Radio Service (GPRS) system, a Long-Term Evolution (LTE) system, a LTE-advanced (LTE-A) system, a Universal Mobile Telecommunications System (UMTS), an evolved LTE (eLTE) system, a future communications system, and another communications system. Specifically, this is not limited herein.

Figure 1:
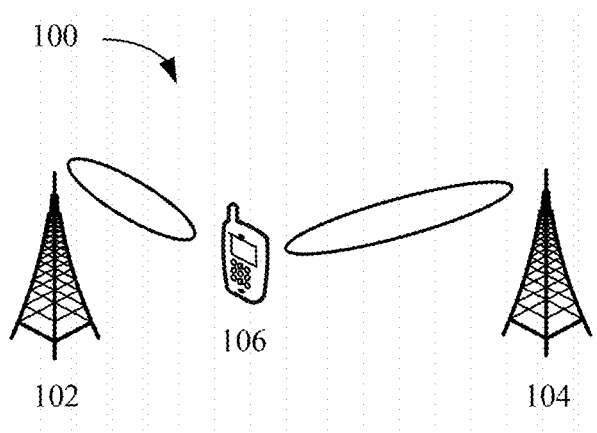
FIG. 1 is a schematic diagram of a communications system to which an embodiment of this application is applicable.

For ease of understanding the embodiments of this application, a communications system shown in FIG. 1 is first used as an example to describe in detail a communications system to which the embodiments of this application are applicable. FIG. 1 is a schematic diagram of a communications system to which a communication method according to an embodiment of this application is applicable. As shown in FIG. 1, a communications system 100 includes a network device 102 and a terminal device 106. A plurality of antennas may be configured for the network device 102, and a plurality of antennas may also be configured for the terminal device 106. Optionally, the communications system 100 may further include a network device 104, and a plurality of antennas may also be configured for the network device 104.

It should be understood that the network device 102 or the network device 104 may further include a plurality of components (for example, a processor, a modulator, a multiplexer, a demodulator, and a demultiplexer) related to signal sending and receiving.

A terminal in the embodiments of this application is a device that has a wireless transceiver function or a chip that can be disposed in the device, or may be referred to as UE, an access terminal, a subscriber unit, a subscriber station, a mobile station, a mobile console, a remote station, a remote terminal, a mobile device, a user terminal, a terminal, a wireless communications device, a user agent, a user apparatus, or the like. The terminal in the embodiments of this application may be a mobile phone, a tablet (Pad), a computer having a wireless transceiver function, a virtual reality (VR) terminal, an augmented reality (AR) terminal, a wireless terminal in industrial control, a wireless terminal in self driving, a wireless terminal in telemedicine (remote medical), a wireless terminal in a smart grid, a wireless terminal for transportation safety, a wireless terminal in a smart city, a wireless terminal in a smart home, or the like. An application scenario is not limited in the embodiments of this application. In this application, the terminal described above and the chip that can be disposed in the terminal are collectively referred to as the terminal.

An access network device is a device having a wireless transceiver function or a chip that can be disposed in the device. The device includes but is not limited to a next generation RAN (NG-RAN), an evolved NodeB (eNB), a radio network controller (RNC), an NB, a base station controller (BSC), a base transceiver station (BTS), a home base station (for example, a home eNB (HNB)), a baseband unit (BBU), an access point (AP) in a WI-FI system, a wireless relay node, a wireless backhaul node, a transmission point (TP) or a transmission and reception point (TRP), or the like. The device may alternatively be a next generation NB (gNB) in a 5G system such as an NR system, a transmission point (a TRP or a TP), one antenna panel or one group of antenna panels (including a plurality of antenna panels) of a base station in a 5G system, or a network node that constitutes the gNB or the transmission point, for example, a BBU or a distributed unit (DU).

A session management network element is mainly responsible for a SMF in a mobile network, for example, a function of establishing, modifying, or releasing a session. A specific function is, for example, a function of allocating an IP address to a user, selecting a UPF network element that provides a packet forwarding function, or the like. In a 5G network, a session management network element may be an SMF network element. In future communications, for example, in a 6th generation (6G) network, a session management network element may still be an SMF network element or have another name. This is not limited in this application.

A user plane network element is mainly responsible for processing a user packet, for example, forwarding or charging for the user packet. In the 5G, a user plane network element may be a UPF network element. In the future communications, for example, in the 6G, a user plane network element may still be a UPF network element or have another name. This is not limited in this application.

It may be understood that the network element may be a physical device, a network element in a hardware device, a software function running on dedicated hardware, or a virtualization function instantiated on a platform (for example, a cloud platform).

In addition, the word "example" in the embodiments of this application is used to represent giving an example, an illustration, or a description. Any embodiment or design scheme described as an "example" in this application should not be explained as being more preferred or having more advantages than another embodiment or design scheme. Exactly, "example" is used to present a concept in a specific manner.

The network architecture and the service scenario described in the embodiments of this application are intended to describe the technical solutions in the embodiments of this application more clearly, and do not constitute a limitation on the technical solutions provided in the embodiments of this application. A person of ordinary skill in the art may be aware that with the evolution of the network architecture and the emergence of new service scenarios, the technical solutions provided in the embodiments of this application are also applicable to similar technical problems.

The following first describes technical terms that may appear in the embodiments of this application.

1. A network instance is a domain in a network. Network addresses of all network devices in a domain need to be different, or MAC addresses of all the network devices need to be different. A network instance identifier is used to identify a network instance.

2. A packet forwarding rule may be a method for switching or transmitting a packet using a UPF. For example, an SMF sends a packet forwarding rule to a UPF, the rule is used to indicate how the UPF forwards a packet, and the forwarding rule may include buffering, sending, or discarding the packet.

The packet forwarding rule may include one or more of the following 1. a first network instance identifier of a network instance to which an access network device belongs, 2. an interface address of the access network device, 3. a network address of the access network device, where the network address is a network address of an access network device accessed by a terminal, and the network address may be an IP address or the like, and 4. a tunnel identifier that is of the access network device and that is associated with the network instance identifier.

3. An interface address corresponds to an access network device. The interface address is usually a hardware address of the access network device, for example, a MAC address, and is written into the access network device by default. In a virtualization technology, the interface address may alternatively be a virtual interface address created in the access network device, is an address of the access network device outside an IP layer, and is used to mark the access network device outside the IP layer.

In the embodiments of this application, the interface address may be any one of or a combination of a plurality of the following a media access control MAC address, a TEID, a data link layer address, an IP address, and a virtual local area network identifier VLAN ID.

4. A network address may be an address of a device in a network, for example, may be an IP address or the like, and examples are not described one by one herein.

5. A packet forwarding address corresponds to a user plane device, and the user plane device may forward a received packet to a device that corresponds to the packet forwarding address. In a possible implementation, an interface address is equivalent to the packet forwarding address, in an embodiment, from a perspective of the user plane device, an interface address of an access network device is a packet forwarding address for forwarding a packet to the access network device.

In the embodiments of this application, the packet forwarding address may be any one of or a combination of a plurality of the following a media access control MAC address, a TEID, a data link layer address, and a virtual local area network identifier VLAN ID.

6. A tunnel identifier may be a TEID, used to identify a channel for forwarding a packet.

7. A first session is a session between a session management device and a user plane device, and may be an N4 session in the 5G. In a future network, a session name may change. The N4 session is used as an example in subsequent embodiments, but a person skilled in the art may perform replacement based on an actual situation. A second session is a session between a terminal and a DN, and may be a NAS session in the 5G. In the future network, a name of the second session may change. The NAS session is used as an example in the subsequent embodiments, but a person skilled in the art may perform replacement based on an actual situation. The first session and the second session are associated with each other. For example, after determining that the NAS session needs to be established, the session management device may create the N4 session associated with the NAS session.

Figure 2:
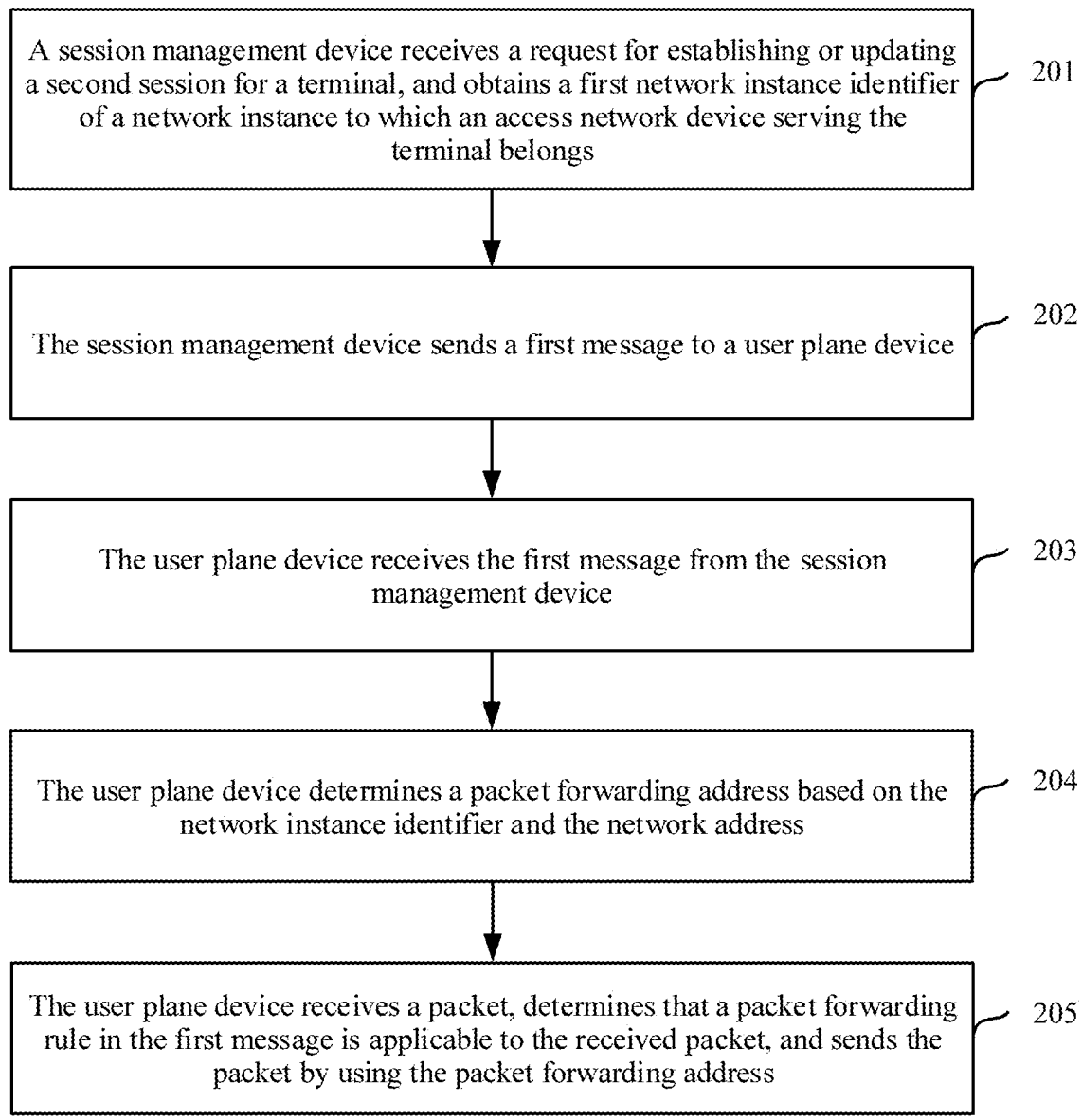
FIG. 2 is a schematic flowchart of a communication method according to an embodiment of this application.

With reference to the foregoing descriptions, FIG. 2 is a schematic flowchart of a communication method according to an embodiment of this application. In a procedure shown in FIG. 2, a user plane device may be a UPF network element or the like, and a session management device may be an SMF network element or the like. This is not limited in this embodiment of this application.

As shown in FIG. 2, the method includes the following steps.

Step 201. The session management device receives a request for establishing or updating a second session for a terminal, and obtains a first network instance identifier of a network instance to which an access network device serving the terminal belongs.

It should be noted that the session management device may be an independent physical device, or may be a function module in a device. Each of other devices in this embodiment of this application may be an independent physical device, or may be a function module in a device.

The second session may be a NAS session.

Step 202. The session management device sends a first message to the user plane device.

The first message is used to request establishing or updating a first session, the first session is associated with the second session, the first message includes the first network instance identifier and a network address, and the network address is located in a packet forwarding rule in the first message. The first message is used to request establishing or updating an N4 session, the first message includes the first network instance identifier and the network address, and the network address is located in the packet forwarding rule in the first message.

When the first session is the N4 session, the first message may be a message such as an N4 session establishment request message. A name of the first message is not limited in this embodiment of this application. Examples are not described one by one herein.

Step 203. The user plane device receives the first message from the session management device.

Step 204. The user plane device determines a packet forwarding address based on the first network instance identifier and the network address.

Step 205. The user plane device receives a packet, determines that the packet forwarding rule in the first message is applicable to the received packet, and sends the packet using the packet forwarding address.

It should be noted that there is no sequence between receiving the packet and receiving the first message by the user plane device. The user plane device may first receive the packet, or may first receive the first message. This is not limited in this embodiment of this application.

In step 201, the session management device may receive a request that is for establishing or updating the second session and that is sent by the terminal, or may receive a request that is for establishing or updating the second session and that is sent by the access network device serving the terminal. This is not limited in this embodiment of this application. In addition, in this embodiment of this application, how to establish or update the second session is not limited. For details, refer to descriptions in other approaches. Details are not described herein.

A time sequence between receiving the request for establishing or updating the second session for the terminal and obtaining the first network instance identifier by the session management device is not limited in this embodiment of this application. The two actions may occur simultaneously or successively.

In this embodiment of this application, the session management device may obtain the first network instance identifier in a plurality of manners. Details are described below.

In a first possible scenario, the session management device receives the first network instance identifier sent by an access and mobility management device.

Specifically, the access and mobility management device obtains the first network instance identifier that corresponds to the access network device. For example, 1. a device setup request message including the first network instance identifier is sent through the access network device. The device setup request message is used to indicate that the access network device has accessed a network and can operate normally. For example, 2 in an attach procedure of the UE, the first network instance identifier that corresponds to the access network device is received.

In a NAS session establishment process, after receiving a NAS session establishment request sent by the access network device, the access and mobility management device sends, to the session management device, the first network instance identifier of the network instance to which the access network device belongs and a session request message. The session request message is used to request establishing a NAS session.

It should be noted that in this embodiment of this application, the network instance to which the access network device belongs may be pre-configured. For example, an operator divides an entire network into network instances, and configures, for each access network device, a network instance to which the access network device belongs. For example, an access network device 1 belongs to a network instance 1, and an access network device 10 belongs to a network instance 2.

Optionally, in another implementation, the device setup request message may further include information such as an interface address of the access network device. In this case, in the NAS session establishment process, after receiving the NAS session establishment request sent by the access network device, the access and mobility management device sends the interface address of the access network device and the session request message to the session management device. Details are not described herein again.

It should be noted that the access and mobility management device has an access and mobility management function (AMF) in the 5G, or the like. This is not limited in this embodiment of this application.

In a second possible scenario, the session management device receives the first network instance identifier sent by the access network device.

Specifically, in a NAS session establishment process, the terminal sends a session request message to the access network device. The session request message is used to request establishing a NAS session, and the session request message includes information such as a NAS session identifier.

After receiving the session request message, the access network device sends, to the session management device, the first network instance identifier of the network instance to which the access network device belongs and a session establishment request message, where the session establishment request message is used to request establishing the NAS session such that the session management device obtains the first network instance identifier.

Optionally, in another implementation, in the NAS session establishment process, after receiving the session request message, the access network device sends an interface address of the access network device and the session request message to the session management device.

In a third possible scenario, the session management device determines the first network instance identifier based on a first parameter sent from the terminal or the access network device and a second parameter stored in the session management device.

Specifically, in a NAS session establishment process, the terminal sends a request message to the access network device. The request message is used to request establishing a NAS session. After receiving the request message from the terminal, the access network device may send the first parameter to the session management device.

The first parameter is one of or a combination of an identifier of the access network device and a network address of the access network device, and the second parameter is a correspondence between one or more parts of the first parameter and a network instance identifier.

For example, the first parameter is the network address of the access network device, and the second parameter is a correspondence between the network address of the access network device and the network instance identifier. The second parameter is pre-configured in the session management device. In the NAS session establishment process, after receiving the network address sent by the access network device, the session management device determines, as the first network instance identifier associated with the NAS session, a network instance identifier that corresponds, in the second parameter, to the network address sent by the access network device.

For another example, the first parameter is the identifier of the access network device, and the second parameter is a correspondence between the identifier of the access network device and the network instance identifier. The second parameter is pre-configured in the session management device. In the NAS session establishment process, after receiving the identifier sent by the access network device, the session management device determines, as the first network instance identifier associated with the NAS session, the network instance identifier that corresponds, in the second parameter, to the identifier sent by the access network device.

It should be noted that in this embodiment of this application, the identifier of the access network device may be an identification code of the access network device, and the network address of the access network device may be an IP address of the access network device or the like.

In step 202, when the first session is an N4 session, and the second session is the NAS session, after obtaining the first network instance identifier, when receiving a NAS session establishment or update request from the terminal or the access network device, the session management device establishes or updates, for the NAS session, the N4 session that corresponds to the NAS session. The N4 session and the NAS session may be in a one-to-one correspondence. The N4 session is a session that is between the session management device and the user plane device and that is on an N4 interface. If a name of an interface between the session management device and the user plane device changes, the N4 session may be replaced with a session on the interface having the corresponding name. This is not limited herein.

The session management device may determine an N4 session identifier of the N4 session that needs to be established or updated, and parameters such as a packet detection rule and a packet forwarding rule that are associated with the N4 session. The packet forwarding rule is associated with at least one packet detection rule. The packet detection rule and the packet forwarding rule may be pre-configured in the session management device, may be configured in the session management device in another manner, or may be obtained by the session management device in another manner. This is not limited in this embodiment of this application.

In this embodiment of this application, an IP address and a tunnel identifier may be pre-configured in each packet detection rule. The IP address may be an IP address of the user plane device, and the tunnel identifier may be a tunnel identifier of a tunnel for forwarding a packet in the first session. In this embodiment of this application, whether the packet forwarding rule associated with the packet detection rule is applicable to the received packet may be determined using the packet detection rule. Details are described below.

As described above, in this embodiment of this application, the packet forwarding rule may include the first network instance identifier, or may not include the first network instance identifier. Content included in the first message may be different in different cases.

In a possible implementation, when the packet forwarding rule does not include the first network instance identifier, the first message includes the first network instance identifier and the packet forwarding rule. The packet forwarding rule includes the network address, and the first network instance identifier is outside the packet forwarding rule.

In this case, the first network instance identifier and the packet forwarding rule are independent of each other, and may be located in different fields in the first message.

In another possible implementation, when the packet forwarding rule includes the first network instance identifier, the first message includes the packet forwarding rule. The packet forwarding rule includes the network address and the first network instance identifier.

Optionally, in another implementation, when the session management device receives a packet forwarding address and the session request message from the access network device or the access and mobility management device, the packet forwarding rule may include the packet forwarding address. In this implementation, the user plane device may subsequently directly obtain the packet forwarding address according to the packet forwarding rule.

Optionally, when sending the packet forwarding rule using the first message, the session management device may further send, using the first message, the packet detection rule associated with the packet forwarding rule. The first message may further include other content. Details are not described herein in this embodiment of this application.

In step 203, when the first session is the N4 session, the user plane device may further establish an association relationship between the N4 session identifier and the interface address of the access network device. An action performed by the user plane device to establish the association relationship between the N4 session identifier and the interface address may be installing the N4 session identifier on the interface address.

In step 204, the user plane device may be pre-configured an association relationship between the network address of the access network device, the first network instance identifier of the network instance to which the access network device belongs, and the packet forwarding address that corresponds to the access network device. The user plane device may determine the interface address associated with the first network instance identifier and the network address in the first message as the packet forwarding address that corresponds to the access network device, to forward the packet to the access network device based on the packet forwarding address.

Optionally, in this embodiment of this application, the packet forwarding address that corresponds to the access network device may alternatively be actively reported by the access network device to the session management device, or may be obtained by the session management device in another manner. This is not limited in this embodiment of this application. After obtaining the packet forwarding address that corresponds to the access network device, the session management device sends the packet forwarding address that corresponds to the access network device to the user plane device. In this case, the user plane device may not need to perform step 204.

Network devices in different domains may have same network addresses (for example, IP addresses). Therefore, to uniquely identify a network device, a network device in a network instance may be identified using both a network instance identifier and a network address. Because access network devices belonging to a same network instance have different network addresses, the access network device may be uniquely identified based on the network address of the access network device and the first network instance identifier of the network instance to which the access network device belongs, to determine the packet forwarding address used to send the packet to the access network device. In this way, a receiver that receives the packet can be uniquely determined, thereby avoiding a problem that the receiver cannot be determined when the packet is routed only based on the network address.

In step 205. After the user plane device receives the packet, the user plane device matches header information of the received packet with the at least one packet detection rule, and determines, if the matching succeeds, that the packet forwarding rule is applicable to the packet. The header information of the packet may include a destination address and the tunnel identifier in the packet, or may include a 5-tuple (including a source address, the destination address, a source port number, a destination port number, and a protocol number) of the packet and the IP address of the terminal that receives the packet.

If the header information of the packet includes the destination address and the tunnel identifier, after the user plane device receives the packet, the user plane device matches the destination address and the tunnel identifier in the received packet with the at least one packet detection rule, and determines, if the matching succeeds, that the packet forwarding rule is applicable to the packet. Specifically, the user plane device matches the destination address and the tunnel identifier in the received packet with the IP address and the tunnel identifier that are pre-configured in the packet detection rule. If it is determined that the IP address pre-configured in the packet detection rule is the same as the destination address in the packet, and the tunnel identifier pre-configured in the packet detection rule is the same as the tunnel identifier in the packet, it may be determined that matching between the packet and the packet detection rule succeeds, otherwise, it is determined that the matching fails. After the matching succeeds, the user plane device may determine that the packet forwarding rule is applicable to the packet.

After determining that the packet forwarding rule is applicable to the packet, the user plane device may send the packet to the access network device that corresponds to the packet forwarding address. The access network device may finally forward, to the corresponding terminal, the packet received from the user plane device.

It should be noted that in this embodiment of this application, after receiving the first message, the user plane device may first store the network instance identifier and the network address that are in the first message, and then determine the packet forwarding address when the user plane device receives the packet. Alternatively, the user plane device may first determine the packet forwarding address based on the first network instance identifier and the network address after receiving the first message, and directly use the packet forwarding address after receiving the packet. This is not limited in this embodiment of this application.

Optionally, in this embodiment of this application, the access network device may need to send an uplink packet to the user plane device. When the user plane device does not belong to any network instance, the access network device does not need to determine a packet forwarding address that corresponds to the user plane device, and subsequently directly forwards the uplink packet.

When the user plane device belongs to a network instance, in a first possible scenario, the user plane device needs to send, to the session management device, a second network instance identifier of the network instance to which the user plane device belongs, and the session management device sends the second network instance identifier to the access network device. In this way, the access network device may determine a second interface address of the user plane device based on a network address (for example, an IP address) of the user plane device and the second network instance identifier such that the access network device subsequently forwards the uplink packet.

In a second possible scenario, the user plane device directly sends a second interface address of the user plane device to the session management device, and the session management device forwards the second interface address of the user plane device to the access network device. In this way, the access network device may forward the uplink packet based on the second interface address of the user plane device.

A detailed process in which the access network device further forwards the uplink packet is not limited in this embodiment of this application, and details are not described herein again.

As described above, in this embodiment of this application, the session management device may alternatively directly obtain the packet forwarding address that corresponds to the access network device, and send the packet forwarding address to the user plane device. Details are described as follows.

Figure 3:
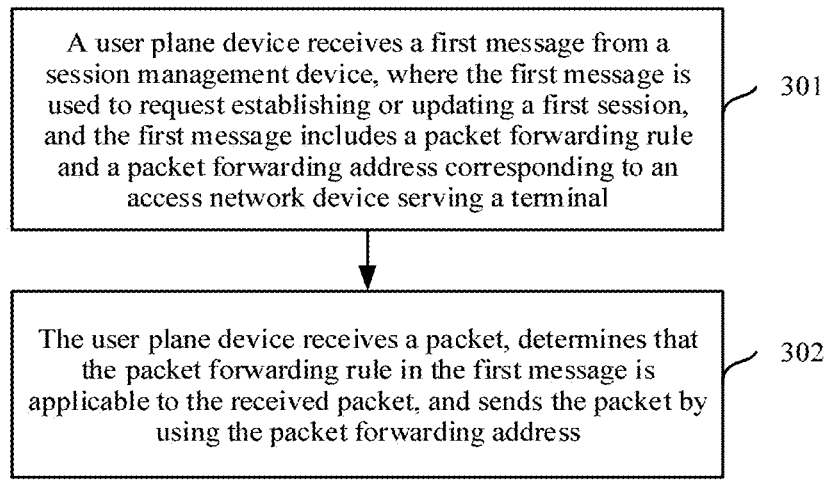
FIG. 3 is a schematic flowchart of a communication method according to an embodiment of this application.

FIG. 3 is a schematic flowchart of a communication method according to an embodiment of this application. In a procedure shown in FIG. 3, a user plane device may be a UPF network element or the like, and a session management device may be an SMF network element or the like. This is not limited in this embodiment of this application.

The method includes the following steps.

Step 301. The user plane device receives a first message from the session management device, where the first message is used to request establishing or updating a first session, and the first message includes a packet forwarding rule and a packet forwarding address corresponding to an access network device serving a terminal.

The packet forwarding address is sent by the access network device to the session management device, or may be actively requested by the session management device from the access network device.

In this embodiment of this application, there is an association relationship between the packet forwarding address, a network address of the access network device, and a first network instance identifier of a network instance to which the access network device belongs. The association relationship may be pre-configured in the user plane device. The user plane device may send, based on the packet forwarding address and the network instance to which the access network device belongs, a packet to the access network device.

Step 302. The user plane device receives the packet, determines that the packet forwarding rule in the first message is applicable to the received packet, and sends the packet using the packet forwarding address.

After receiving the packet to be sent to the access network device, the user plane device may determine a destination address and a tunnel identifier in the packet.

If determining that a packet detection rule associated with the packet forwarding rule includes the destination address and the tunnel identifier in the packet, the user plane device determines that the packet forwarding rule is applicable to the packet. An association relationship between the packet forwarding rule and the packet detection rule may be pre-configured. For details, refer to descriptions in step 201 to step 205.

After determining that the packet forwarding rule is applicable to the packet, the user plane device may send the packet to the access network device that corresponds to the packet forwarding address.

For other terms or content in step 301 and step 302, refer to the related descriptions in step 201 to step 205. Details are not described herein again.

Figure 4:
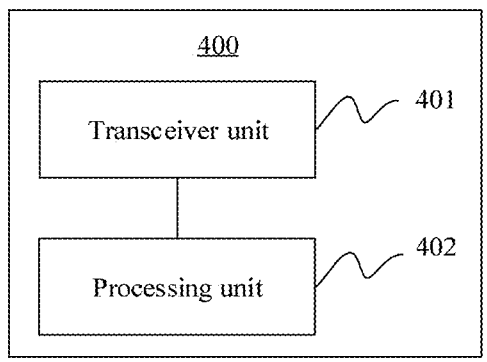
FIG. 4 is a schematic structural diagram of a communications apparatus according to an embodiment of this application.

FIG. 4 is a schematic structural diagram of a communications apparatus according to an embodiment of this application. The communications apparatus may be configured to perform actions of the user plane device in the foregoing method embodiments. The communications apparatus 400 includes a transceiver unit 401 and a processing unit 402.

The transceiver unit 401 is configured to receive a first message from a session management device, where the first message is used to request establishing or updating a first session, the first message includes a first network instance identifier of a network instance to which an access network device serving a terminal belongs and a network address of the access network device, and the network address is located in a packet forwarding rule in the first message.

The processing unit 402 is configured to determine a packet forwarding address based on the first network instance identifier and the network address.

The transceiver unit 401 is configured to receive a packet, determine that the packet forwarding rule in the first message is applicable to the received packet, and send the packet using the packet forwarding address.

In a possible implementation, the first network instance identifier is located in the packet forwarding rule, or the first network instance identifier is located in the first message but outside the packet forwarding rule.

In a possible implementation, the first message further includes at least one packet detection rule associated with the packet forwarding rule, and the processing unit 402 is further configured to match a destination address and a tunnel identifier in the received packet with the at least one packet detection rule, and determine, if the matching succeeds, that the packet forwarding rule is applicable to the packet.

In a possible implementation, the packet forwarding address is any one of or a combination of a plurality of the following a media access control MAC address, a TEID, a data link layer address, and a virtual local area network identifier VLAN ID.

Figure 5:
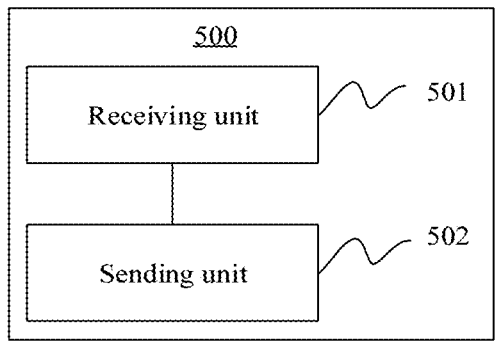
FIG. 5 is a schematic structural diagram of a communications apparatus according to an embodiment of this application.

FIG. 5 is a schematic structural diagram of a communications apparatus according to an embodiment of this application. The communications apparatus may be configured to perform actions of the session management device in the foregoing method embodiments. The communications apparatus 500 includes a receiving unit 501 and a sending unit 502.

The receiving unit 501 is configured to receive a request for establishing or updating a second session for a terminal, and obtain a first network instance identifier of a network instance to which an access network device serving the terminal belongs.

The sending unit 502 is configured to send a first message to a user plane device, where the first message is used to request establishing or updating a first session, the first session is associated with the second session, the first message includes the first network instance identifier and a network address, and the network address is located in a packet forwarding rule in the first message.

In an optional implementation, the receiving unit 501 is further configured to receive the first network instance identifier from an access and mobility management device, receive the first network instance identifier from the access network device, or determine the first network instance identifier based on a first parameter that is from the terminal or the access network device and a second parameter stored in the session management device, where the first parameter is one of or a combination of an identifier of the access network device and the network address of the access network device, and the second parameter is a correspondence between one or more parts of the first parameter and a network instance identifier.

In an optional implementation, the receiving unit 501 is further configured to obtain a second network instance identifier of a network instance to which the user plane device belongs, and the sending unit 502 is further configured to send the second network instance identifier to the access network device.

Figure 6:
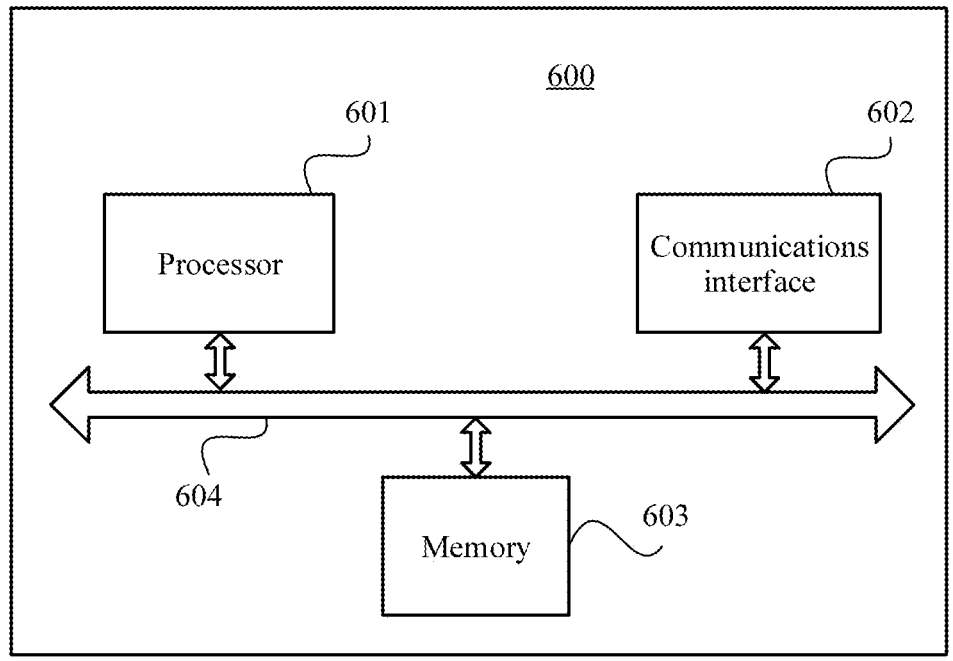
FIG. 6 is a schematic structural diagram of a communications apparatus according to an embodiment of this application.

FIG. 6 is a schematic structural diagram of a communications apparatus according to an embodiment of this application. The communications apparatus may be a user plane device, and the apparatus may perform the actions of the user plane device in the foregoing method embodiments. Optionally, the communications apparatus may be a network element such as a UPF.

Referring to FIG. 6, the communications apparatus 600 includes a processor 601, a communications interface 602, and a memory 603. The processor 601, the communications interface 602, and the memory 603 are connected to each other using a bus 604.

The communications interface 602 is configured to receive a first message from a session management device, where the first message is used to request establishing or updating a first session, the first message includes a first network instance identifier of a network instance to which an access network device serving a terminal belongs and a network address of the access network device, and the network address is located in a packet forwarding rule in the first message.

The processor 601 is configured to determine a packet forwarding address based on the first network instance identifier and the network address.

The communications interface 602 is configured to receive a packet, determine that the packet forwarding rule in the first message is applicable to the received packet, and send the packet using the packet forwarding address.

In a possible implementation, the first network instance identifier is located in the packet forwarding rule, or the first network instance identifier is located in the first message but outside the packet forwarding rule.

In a possible implementation, the first message further includes at least one packet detection rule associated with the packet forwarding rule.

The processor 601 is further configured to match a destination address and a tunnel identifier in the received packet with the at least one packet detection rule, and determine, if the matching succeeds, that the packet forwarding rule is applicable to the packet.

In a possible implementation, the packet forwarding address is any one of or a combination of a plurality of the following a media access control MAC address, a TEID, a data link layer address, and a virtual local area network identifier VLAN ID.

Figure 7:
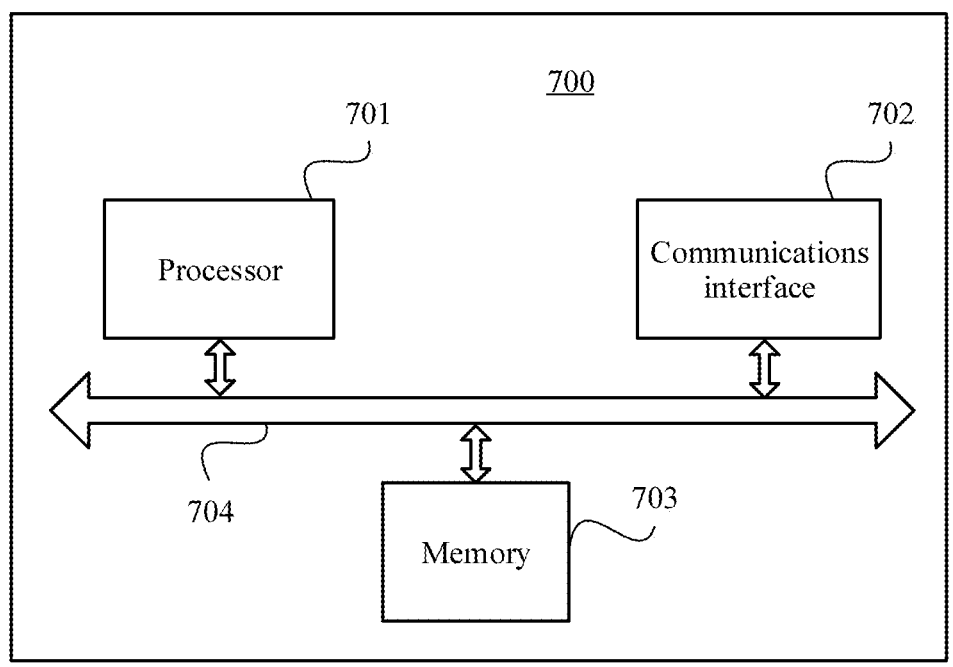
FIG. 7 is a schematic structural diagram of a communications apparatus according to an embodiment of this application.

FIG. 7 is a schematic structural diagram of a communications apparatus according to an embodiment of this application. The communications apparatus may be a session management device, and the apparatus may perform the actions of the session management device in the foregoing method embodiments. Optionally, the communications apparatus may be a network element such as an SMF.

Referring to FIG. 7, the communications apparatus 700 includes a processor 701, a communications interface 702, and a memory 703. The processor 701, the communications interface 702, and the memory 703 are connected to each other using a bus 704.

The communications interface 702 is configured to receive a request for establishing or updating a second session for a terminal, and obtain a first network instance identifier of a network instance to which an access network device serving the terminal belongs.

The communications interface 702 is configured to send a first message to a user plane device, where the first message is used to request establishing or updating a first session, the first session is associated with the second session, the first message includes the first network instance identifier and a network address, and the network address is located in a packet forwarding rule in the first message.

In an optional implementation, the communications interface 702 is further configured to receive the first network instance identifier from an access and mobility management device, receive the first network instance identifier from the access network device, or determine the first network instance identifier based on a first parameter that is from the terminal or the access network device and a second parameter stored in the session management device, where the first parameter is one of or a combination of an identifier of the access network device and the network address of the access network device, and the second parameter is a correspondence between one or more parts of the first parameter and a network instance identifier.

In an optional implementation, the communications interface 702 is further configured to obtain a second network instance identifier of a network instance to which the user plane device belongs, and send the second network instance identifier to the access network device.

In the embodiments of this application, the communications interface may be a wired communications interface, a wireless communications interface, or a combination thereof. The processor may be a central processing unit (CPU), a network processor (NP), or a combination of a CPU and an NP. The processor may further include a hardware chip. The hardware chip may be an application-specific integrated circuit (ASIC), a programmable logic device (PLD), or a combination thereof. The PLD may be a complex programmable logic device (CPLD), a field-programmable gate array (FPGA), generic array logic (GAL), or any combination thereof. The memory may be a volatile memory such as a random-access memory (RAM), a non-volatile memory such as a read-only memory (ROM), a flash memory, a hard disk drive (HDD), or a solid-state drive (SSD), or a combination of the foregoing types of memories.

Obviously, a person skilled in the art can make various modifications and variations to this application without departing from the scope of this application. This application is intended to cover these modifications and variations of this application provided that they fall within the scope of protection defined by the following claims and their equivalent technologies.

What is claimed is:

1. A communication method implemented by a session management device, wherein the method comprises:
receiving a request for establishing or updating a second session for a terminal;
obtaining a first network instance identifier of a network instance, wherein the first network instance identifer is for determining an interface corresponding to an access network device;
sending a first message to a user plane device, wherein the first message requests to establish or update a first session, wherein the first session is associated with the second session, wherein the first message comprises the first network instance identifier and a network address, and wherein the network address is located in a packet forwarding rule in the first message;
obtaining a second network instance identifier of the second network instance, wherein the second network instance identifer is for determining an interface corresponding the user plane device; and
sending the second network instance identifier to the access network device.

2. The communication method of claim 1, wherein obtaining the first network instance identifier comprises determining the first network instance identifier based on a first parameter from the access network device and a second parameter stored in the session management device.

3. The communication method of claim 2, wherein the first parameter is at least one of an identifier of the access network device or the network address of the access network device, and wherein the second parameter is a correspondence between one or more parts of the first parameter and a network instance identifier.

4. The method of claim 1, wherein the first session is an N4 session.

5. The communication method of claim 4, wherein the second session is a non-access stratum (NAS) session.

6. A session management device, comprising:
a processor; and
a memory coupled to the processor and configured to store instructions that, when executed by the processor, cause the session management device to be configured to:
receive a request for establishing or updating a second session for a terminal;
obtain a first network instance identifier of a network instance, wherein the first network instance identifier is for determining an interface corresponding to an access network device;
send a first message to a user plane device, wherein the first message requests establishing to establish or update a first session, wherein the first session is associated with the second session, wherein the first message comprises the first network instance identifier and a network address, and wherein the network address is located in a packet forwarding rule in the first message,
obtain a second network instance identifier of the second network instance, wherein the second network instance identifer is for determining an interface corresponding the user plane device; and
send the second network instance identifier to the access network device.

7. The session management device of claim 6, wherein the instructions further cause the session management device to be configured to determine the first network instance identifier based on a first parameter from the access network device and a second parameter in the session management device.

8. The session management device of claim 7, wherein the first parameter is at least one of: an identifier of the access network device or the network address of the access network device, and wherein the second parameter is a correspondence between one or more parts of the first parameter and a network instance identifier.

9. The session management device of claim 6, wherein the first session is an N4 session.

10. The session management device of claim 9, wherein the second session is a non-access stratum (NAS) session.

11. A system comprising:
a user plane device; and
a session management device coupled to the user plane device and configured to:
receive a request for establishing or updating a second session for a terminal;
obtain a first network instance identifier of a network instance, wherein the first network instance identifier is for determining an interface corresponding to an access network device;
send a first message to the user plane device, wherein the first message requests to establish or update a first session, wherein the first session is associated with the second session, wherein the first message comprises the first network instance identifier and a network address, and wherein the network address is located in a packet forwarding rule in the first message;
obtain a second network instance identifier of the second network instance, wherein the second network instance identifer is for determining an interface corresponding the user plane device; and
send the second network instance identifier to the access network device.

12. The system of claim 11, wherein the session management device is further configured to determine the first network instance identifier based on a first parameter from the access network device and a second parameter stored in the session management device.

13. The system of claim 12, wherein the first parameter is at least one of an identifier of the access network device or the network address of the access network device.

14. The system of claim 11, further comprising the access network device, wherein the access network device is configured to receive the second network instance identifier.

15. The system of claim 11, wherein the first session is an N4 session and the second session is a non-access stratum (NAS) session.

16. The system of claim 13, wherein the second parameter is a correspondence between one or more parts of the first parameter and a network instance identifier.

17. A communication method, comprising:
receiving, by a session management device, a request for establishing or updating a second session for a terminal;
obtaining, by the session management device, a first network instance identifier of a network instance, wherein the first network instance identifier is for determining an interface corresponding to an access network device;
sending, by the session management device, a first message to a user plane device, wherein the first message requests to establish or update a first session, wherein the first session is associated with the second session, wherein the first message comprises the first network instance identifier and a network address, and wherein the network address is located in a packet forwarding rule in the first message;
obtaining, by the session management device, a second network instance identifier of the network instance, wherein the second network instance identifer is for determining an interface corresponding the user plane device;
sending, by the session management device, the second network instance identifier to the access network device; and
receiving, by the user plane device, the first message.

18. The communication method of claim 17, further comprising receiving, by the access network device, the second network instance identifier.

19. The communication method of claim 17, wherein the first session is an N4 session and the second session is a non-access stratum (NAS) session.

* * * * *

UNITED STATES PATENT AND TRADEMARK OFFICE
CERTIFICATE OF CORRECTION

| | |
|---|---|
| PATENT NO. | : 11,528,225 B2 |
| APPLICATION NO. | : 17/036909 |
| DATED | : December 13, 2022 |
| INVENTOR(S) | : Runze Zhou, Shengxian Nie and Zhongping Chen |

It is certified that error appears in the above-identified patent and that said Letters Patent is hereby corrected as shown below:

In the Claims

Claim 1, Column 18, Line 13: "second network instance, wherein" should read "network instance, wherein"

Claim 11, Column 19, Line 27: "second network instance, wherein" should read "network instance, wherein"

Signed and Sealed this
Seventeenth Day of January, 2023

Katherine Kelly Vidal
*Director of the United States Patent and Trademark Office*